Feb. 24, 1953   P. S. CARNES   2,629,237
CHILLED WATER DISTRIBUTION SYSTEM AND MEANS
Filed June 30, 1949
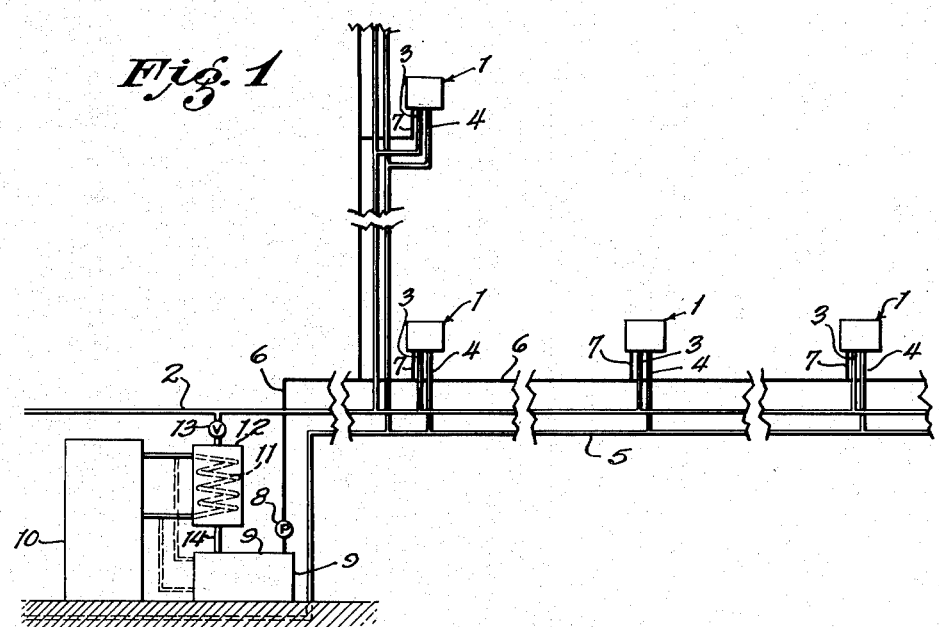
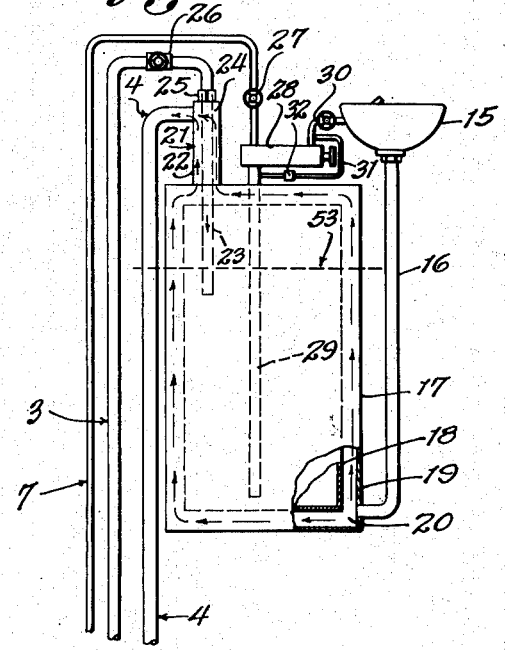
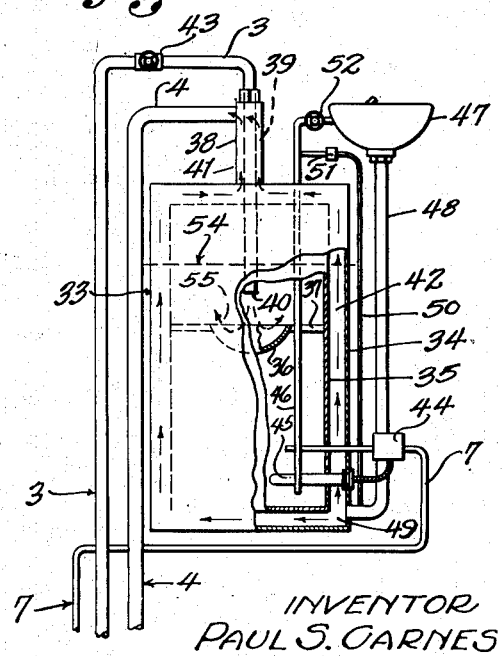
INVENTOR
PAUL S. CARNES
ATTORNEY.

Patented Feb. 24, 1953

2,629,237

UNITED STATES PATENT OFFICE 2,629,237

CHILLED WATER DISTRIBUTION SYSTEM AND MEANS

Paul S. Carnes, Los Angeles, Calif., assignor by decree of distribution to Wilma P. Carnes Application June 30, 1949, Serial No. 102,190

4 Claims. (Cl. 62—141)

The present invention contemplates a system and means utilizing water chilled substantially below the temperature at which it is to be used and mixed at points of use with non-refrigerated water from a service main first cooled in a heat exchanger by recovery of the refrigeration from waste water at the point or points of use. It is a known fact that where outlets for water are of the conventional bubbler type, the percentage of water wasted may run from 60% to 80% of the total quantity of water withdrawn.

Normal practice for the distribution of water from central cooling stations utilizes a two-pipe recirculating system with the outgoing water at approximately the desired outlet temperature. Such a system permits no recovery of refrigeration from wasted water, and introduces additional losses, due to heat absorption by the larger pipes involved. Furthermore, such a system doubles the length of the refrigerated pipe lines and introduces additional heat, by way of the pumping machinery. A two-pipe recirculating system has outlet temperatures which vary considerably between the nearest and furthest points of use.

An object of the invention is the provision of a chilled water or other liquid distribution system and means which provides drinking water from relatively large cooling plants to a number of scattered points of use, with variable and selectable delivery temperatures at each point.

A further object is the provision of a chilled liquid system which permits the recovery of refrigeration from the liquid withdrawn from the system which is normally wasted.

A further object is the provision of a chilled liquid distribution system and means wherein provision is made for storing liquid chilled or refrigerated in advance to care for periods of particularly rapid withdrawal of liquid from the system.

A further object is the provision of a chilled drinking water distribution system and means wherein the said water at various points of use located at appreciable distances from one another permits control of temperatures without variation in temperatures of the withdrawn water between different points of withdrawal.

A further object is the provision of a system and means for providing chilled and/or refrigerated drinking water from a central cooling plant to a number of scattered points of use without the use of ammonia, methylchloride, sulphur dioxide, or other commonly used refrigerants in evaporators or cooling coils at the points where water is to be withdrawn for use.

A further object of the invention is the provision of a drinking water distribution system and means which may be enlarged or altered within wide limits, without extensive alterations to piping systems.

The invention has for objects the provision of a chilled drinking water system and means, which is economical to fabricate and install, and capable of producing superior results.

With the above-mentioned and other objects in view, the invention consists in the novel and useful provision, formation, construction, association of parts, members and features, together with a method of utilizing said parts and members, all as disclosed in the drawing, described generally and more particularly pointed out in the claims.

In the drawing:

Figure 1 is a fragmentary diagrammatic view showing various stations and connections with said stations utilizing the system and means of the invention;

Figure 2 is a fragmentary diagrammatic view, partly in section, illustrating one adaptation of the invention; and Figure 3 is a fragmentary, partially sectional, view illustrating a modification of the system and means, shown in Figure 2.

Referring to Figure 1, I have illustrated therein a series of stations 1, four in number, at which station there is assumed to be bubblers. A water supply pipe 2 leads to each station through a connecting pipe, designated generally as 3. Each station is provided with a branch drain pipe 4 which connects with a main drain pipe 5. In addition, a pipe 6 for refrigerated water connects with each station, through a branch pipe 7. Pipe 6 connects with a pump 8, the pump in turn being in fluid connection with a refrigerated water storage tank 9. A refrigerating means is provided at 10, this means connecting with a closed circuit coil 11 in tank 12 of a heat exchanger, there being a valved connection at 13 between the tank 12 and water supply pipe 2, with an outlet pipe at 14 leading to the storage tank 9. Thus, supply water at normal temperature is directed into the tank 12, and refrigerated by the coil 11, the refrigerated water being received in the storage tank, and then distributed to the various stations through pipe 6.

I may provide different forms of drinking water units, such as illustrated diagrammatically in Figures 2 and 3. The system of Figure 2 will will be described first, and such a system and means may be provided at all of the stations, shown in Figure 1.

A bubbler 15 connects with a branch drain pipe 16 leading to a jacketed storage tank 17. In the simplest embodiment, the storage tank comprises internal and external spaced apart receptacles or casings 18 and 19, providing a space 20 between said casings, with which space the branch drain pipe 16 communicates. Secured to the storage tank is a pre-cooler 21. The pre-cooler includes a short length tube 22 communicating with the space 20 at the top of the tank and centrally of said tube and extending downwardly within the receptacle 18 is a pipe 23. Pipe 23 is sealed where it passes through the casing 18, so as not to communicate with space 20. This pipe is of lesser diameter than the internal diameter of the tube 22 so as to provide an annular space 24 between the tube 22 and the pipe 23. A seal means 25 of some form closes the top of the tube 22 and allows the pipe 23 to extend beyond the seal means.

Pipe 23 connects with the branch water supply pipe 3 through an interconnecting valve 26. This branch pipe 3 is secured to the water supply pipe 2, shown in Figure 1. The branch drain pipe 4 leads to the annular space 24. The branch pipe 7 for refrigerated water conducted through pipe 6 is provided with a valve at 27 and connects with an inlet of a mixing valve or blender 28. A pipe 29 communicates with a second inlet for the blender 28 and terminates above the base of receptacle 18. A valved pipe 30 leads from the outlet of the blender to the bubbler 15. A bleed line 31 extends between the valved pipe 30 at that portion included between the valve in said pipe and the blender, and connects to pipe 29. The bleed pipe 31 incorporates therein a quantity control 32. The control 32 is of the continuous bleed or by-pass type which may include an orifice, calibrated capillary tubing, needle regulating valve or other means. As such construction is conventional, it is not detailed in the drawing.

The blender 28 is of a type which is well known in the industry and wherein two different liquids are permitted to enter the blender at different temperatures, to be mixed and then delivered from the blender at a selected or desired temperature. By way of example, blenders of this type are manufactured and sold by the Sarco, Inc., New York. Such devices usually incorporate a liquid filled thermostat which operates a plunger which proportions the flow of water through a three-way valve.

Referring to Fig. 3, a jacketed tank 33 has outer and inner receptacles 34 and 35, inner receptacle being provided with a concavo-convex baffle 36 held by spaced arms 37. There is provided at 38 a pre-cooler having the same construction as the pre-cooler 21, shown in Figure 2, in that it includes a depending pipe 39 which extends within the tank 33, and specifically, the inner receptacle 35, the outlet end 40 of said pipe being positioned above the concavity of the baffle. A tube 41 spacedly surrounds the pipe 39 and said tube is in communication with the space 42 included between the receptacles 34 and 35. The branch drain pipe 4 communicates with the space included between the pipe 39 and tube 41, and the branch water supply pipe 3 is in direct communication with the pipe 39. As before, there is a valve 43 for controlling the flow of tap water within the pre-cooler 38.

Refrigerated water from pipe 6 is led through branch pipe 7 into the inner receptacle 35, and at a distance above the base thereof. Included in said branch pipe 7 is a thermostatic control 44. This thermostatic control is of the mechanical-electrical snap action (on-off), or modulating type, and connects with a thermostat 45 passed through the walls of the inner and outer receptacles for contact with the water in the inner receptacle.

A pipe 46 has its inlet end adjacent the base of the inner receptacle and extends upwardly through both receptacles, and outwardly to a bubbler 47. A drain pipe 48 leads from the bubbler to the jacketed space 49 included between the receptacles 34 and 35 and adjacent the bases of said receptacles. Connected to pipes 46 and 48 externally of the tank 33 is a bleed line 50. This bleed line includes a control 51 of the continuous bleed or by-pass type and is similar to the control 32, shown in Figure 2. Passage of water to the bubbler 47 is controlled by a valve 52.

The operation, uses and advantages of the invention described are as follows:

In that form of the invention shown in Figure 2 which is adapted to operate in conjunction with the refrigeration system in Figure 1, it is assumed that the device of Figure 2 represents any one of the several stations 1 shown in Figure 1. Each station includes a bubbler 15 which is to be supplied with chilled drinking water. Water at a given temperature is delivered through the water supply pipe 2 and by means of branches 3 to the different stations 1. This water may be at some temperature, depending upon the temperature of the surrounding atmosphere, or the temperature of the medium through which the pipe is passed, etc., and this water which is usually at an elevated temperature is controlled in its passage through a branch pipe 3 by pressure reducing valve 26, which water then fills wholly or in part the inner receptacle 18 of the tank 17, as indicated for the height of said water by the dotted line 53. The refrigerated water from storage tank 9 is passed into pipe 6 by the pump 8 and through a branch line 7 to the station.

The refrigerated water is controlled as to passage by a valve 27 which water enters one inlet of the mixing valve or blender 28. The other inlet of said blender connects with pipe 29 received within the inner receptacle 18 of the tank. Pipe 29 is in direct communication with the water supply which is assumed to be at an elevated temperature relative to the refrigerated water. The blender 28 mixes the two waters of varying temperatures in such a manner as to deliver through pipe 30 to the bubbler 15 mixed water of a selected temperature. Hence, upon opening the valve in the pipe 30, the operator may drink water of a temperature best suited to health.

Waste water is received within the bowl of the bubbler 15 and passes through the pipe 16 into the space 20 between the outer and inner receptacles of the tank. It is quite apparent that the waste water received in the space 20 will be at the same temperature as the drinking water received at the bubbler, and that this temperature will be lower than the temperature of the supply or tap water.

Among the objects of the present invention is the recovery of refrigeration from the water wasted at the outlet of the bubbler. This waste water circulates in the space 20, as indicated by the arrows, and is passed upwardly into space 24 included between tube 22 and pipe 23 and outwardly through the waste branch pipe 4 into pipe 5. The waste water will refrigerate the supply water within the receptacle 18 and will likewise refrigerate the incoming supply water through branch pipe 3 due to the presence of the pre-cooler 21. This constitutes an initial refrigerating of the supply water directed into the inner receptacle 18. If we assume that the valved pipe 30 is closed for a period of time and then suddenly opened by a user, the water passed through the bubbler might not be at the temperature desired. As a consequence, I have found it expedient to utilize the bleed line 31 with its bypass control 32, which bleed line continuously conducts water of desired temperature into pipe 29. This continuous bleeding of water which has been brought to a desired drinking temperature has a direct effect on the water which is entering pipe 29 for passage through the blender and for mixing with the refrigerated water, with the result that when the valved pipe 30 is opened to the bubbler 15, the water directed therefrom has the desired temperature.

The form of the device shown in Figure 3 functions substantially in the same manner as the device shown in Figure 2, save and except that the incoming water from the water supply pipe 3 is passed through the pipe 39 with the outlet 40 of said pipe positioned above the baffle 36 whereby water is deflected, in the manner indicated by the arrows 55. The baffle 36 keeps the incoming water substantially separated from the body of water, the temperature of which is under regulation by the operation of the thermostatic controlled system, shown at 44 and 45. Thus, I provide in a single tank two separated storage zones. The thermostat 45 operates the valve 44 to regulate entrance of refrigerated water within the inner receptacle. The water which has been blended within the inner receptacle is passed through pipe 46 to the bubbler 47. The waste water from the bubbler 47 is lead by the drain pipe 48 into the jacketed space 49, and as the waste water has been refrigerated, the refrigeration of the waste water aids in refrigerating the water within the receptacle 35 of the tank. The waste water is passed upwardly through the precooler 38 and outwardly through the drain pipe 4. The bleed line 50 which connects the drain pipe 48 and the pipe 46 externally the tank, provides for a constant bleed of the refrigerated drinking water which is being conducted to the bubbler, with the result that a selected temperature of drinking water is always delivered to the bubbler regardless of whether the bubbler is flowing continuously or not.

The device of Figure 3 may as a part of its design have the bleed line received in the catch basin or bowl of the bubbler 47, or the bleed line may be equipped with an anti-siphonage device to comply with various sanitary codes in effect in most cities.

In both illustrations of the invention, as depicted in Figures 2 and 3, I may dispense with the jacketed arrangement for the tank and in place of directing the waste water into the space 20 of Figure 2 or space 49 of Figure 3, pass the waste water directly to a heat exchanger of conventional design and which heat exchanger has a direct effect upon the incoming water from the service main.

The system is well adapted to latent heat storage (ice) to care for fluctuations in peak loads.

It will be seen that my invention utilizes a means for recovering the refrigeration of wasted water, such as by the use of a heat exchanger, together with the use of thermostatically controlled mixing or blending valves of conventional design, as shown in Figure 2, or alternatively, conventional immersion thermostats, as illustrated in Figure 3. I also incorporate the principle of providing a bleed from a delivery line to insure prompt delivery of water at the desired temperature. This bleeding is an essential part of the system in the case of lengthy lines and highly variable rates of usage in order to prevent the accumulation of large quantities of warm water which must be drained away before the user can get water at the desired drinking temperature. This system with the combination of the delivery of refrigerated water below the desired outlet temperature and the bleed line to prevent the accumulation of warmed-up water in periods of low usage, permits the installation of "dead end" stations at virtually any distance from the cooling plant.

The apparatus and system disclosed while described with relation to supplying a chilled drinking water is, nevertheless, adaptable for other purposes. For instance, the system is adaptable to industrial uses where liquids at fixed withdrawal temperatures are required at points remote from the point of application of refrigeration or recirculation of the refrigerated liquid is undesirable or entirely prohibited by technical considerations. The system and means of the present invention is adapted for use in the washing of photographic film, the washing of chemical precipitates, etc.

When the invention is utilized for the purpose of supplying drinking water and other cold liquids, it is often desirable to dispense the liquids at different temperatures at a given point of use. Without increasing the number of conducting pipes between the point where the refrigeration is applied, it is possible with the system and means described to supply any desired temperatures between the limits of the temperature of the refrigerated liquid supply and the temperature of the non-refrigerated liquid from the service main. Furthermore, it is not necessary to use additional blenders as water or other liquids at intermediate temperatures may be withdrawn from the heat exchanger or storage tank if used, at the temperatures existing at the points of withdrawal. If additional blenders are utilized, liquid at accurately controlled temperatures may be withdrawn at any desired temperatures between the limits of two temperatures.

I claim:

1. A chilled liquid distribution means including: means for refrigerating liquid; a source of supply of liquid at normal temperature, a portion of which is led to the refrigerating means; a three-way valve blender having a first inlet, a second inlet and an outlet, means of connection between the refrigerating means for liquid, and an inlet valve of the blender, a jacketed storage tank for supply liquid, means of connection between the supply liquid at normal temperature, and the interior of the jacketed storage tank, means of connection between the second inlet of the blender and the interior of said tank; a bubbler connected to the outlet opening of said blender, a waste line leading from said bubbler to the jacket portion of said storage tank, and means of connection between said jacket portion and a drain line; said blender mixing supply liquid from storage tank with refrigerated liquid to obtain a liquid at the bubbler of selected temperature, and said waste liquid from the bubbler refrigerating the supply liquid received within the jacketed storage tank prior to disposal of said waste liquid.

2. A chilled water and other liquid distribution means including: means for refrigerating water; a source of supply water at normal temperature, a portion of which is led to the refrigerating means; a three-way valve blender having a first inlet, a second inlet and an outlet, means of connection between the refrigerating means for water, and an inlet valve of the blender, a jacketed storage tank for supply water, means of connection between the supply water at normal temperature, and the interior of the jacketed storage tank, means of connection between the second inlet of the blender and the interior of said tank; a bubbler connected to the outlet opening of said blender, a waste line leading from said bubbler to the jacket portion of said tank, and means of connection between said jacket portion and a waste line; said blender mixing supply water from said storage tank with refrigerated water to obtain a water at the bubbler of selected temperature, said waste water from the bubbler refrigerating the supply water received within the jacketed storage tank prior to disposal of said waste water, and a pre-cooler connected with the jacket portion of said storage tank and through which pre-cooler the supply water is piped within the storage tank for initially cooling the supply water prior to entrance within the storage tank.

3. A chilled water and other liquid distribution means including: means for refrigerating water; a source of supply water at normal temperatures, a portion of which is led to the refrigerating means; a three-way valve blender having a first inlet, a second inlet and an outlet, means of connection between the refrigerating means for water, and an inlet valve of the blender, a jacketed storage tank for supply water, means of connection between the supply water at normal temperature, and the interior of the jacketed storage tank, means of connection between the second inlet of the blender and the interior of said tank; a bubbler connected to the outlet opening of said blender, a waste line leading from said bubbler to the jacket portion of said tank, and means of connection between said jacket portion and a waste line; said blender mixing supply water from said storage tank with refrigerated water to obtain a water at the bubbler of selected temperature, said waste water from the bubbler leading into the jacket surrounding said storage tank and refrigerating the supply water received within the jacketed storage tank prior to disposal of said waste water, and a bleed line and bleed control interposed between the water supply connection for said blender and the outlet thereof.

4. A chilled water distribution means including a heat exchanger for receiving non-refrigerated water, a drinking water station remote from said heat exchanger, a blender at said drinking water station, a jacketed storage tank connected to said blender, means for delivering non-refrigerated water from said heat exchanger to said storage tank, means for delivering refrigerated water to said blender, a bubbler at said station, a connection between said blender and said bubbler for conducting mixed refrigerated and non-refrigerated waters to said bubbler, and a connection between said bubbler and the jacket of said jacketed storage tank whereby refrigerated waste water is delivered from said bubbler to the jacket of said jacketed storage tank for initially cooling the water in said storage tank.

PAUL S. CARNES.

REFERENCES CITED

The following references are of record in the file of this patent:

UNITED STATES PATENTS

| Number | Name | Date |
|---|---|---|
| 1,832,070 | Weesner | Nov. 17, 1931 |
| 1,899,013 | Candor | Feb. 28, 1933 |
| 1,910,528 | Dowell | May 23, 1933 |
| 2,127,848 | Smith | Aug. 23, 1938 |
| 2,481,662 | Hastings | Sept. 13, 1949 |
| 2,529,781 | Morrison | Nov. 14, 1950 |